US012780121B2

(12) United States Patent
Kogure et al.

(10) Patent No.: US 12,780,121 B2
(45) Date of Patent: Nov. 3, 2026

(54) WIRE HARNESS ROUTING STRUCTURE, LINK TYPE SLIDE DOOR, AND WIRE HARNESS

(71) Applicant: Yazaki Corporation, Tokyo (JP)

(72) Inventors: Naoto Kogure, Shizuoka (JP); Hikaru Sano, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 282 days.

(21) Appl. No.: 18/735,415

(22) Filed: Jun. 6, 2024

(65) Prior Publication Data

US 2024/0317156 A1 Sep. 26, 2024

Related U.S. Application Data

(63) Continuation of application No. PCT/JP2023/005915, filed on Feb. 20, 2023.

(30) Foreign Application Priority Data

Feb. 28, 2022 (JP) ................................ 2022-028836

(51) Int. Cl.
*B60R 16/02* (2006.01)
*B60J 5/06* (2006.01)
*E05D 15/10* (2006.01)

(52) U.S. Cl.
CPC ............ *B60R 16/0215* (2013.01); *B60J 5/06* (2013.01); *E05D 2015/1076* (2013.01); *E05Y 2900/531* (2013.01)

(58) Field of Classification Search
CPC ... B60R 16/02; B60R 16/027; B60R 16/0215; H02G 1/06; H02G 3/36; H02G 11/00; H02G 11/006
See application file for complete search history.

(56) References Cited

U.S. PATENT DOCUMENTS

| | | | | |
|---|---|---|---|---|
| 6,070,931 A * | 6/2000 | Yamaguchi | B60R 16/0215 | 296/146.7 |
| 6,945,504 B2 * | 9/2005 | Chen | H02G 11/00 | 211/151 |
| 2002/0043818 A1 * | 4/2002 | Fukumoto | E05F 15/646 | 296/155 |
| 2007/0148994 A1 | 6/2007 | Sato et al. | | |
| 2019/0232897 A1 | 8/2019 | Tomosada et al. | | |

FOREIGN PATENT DOCUMENTS

| | | |
|---|---|---|
| JP | 10-088896 A | 4/1998 |
| JP | 2007-196987 A | 8/2007 |
| JP | 2019-134626 A | 8/2019 |

* cited by examiner

*Primary Examiner* — Paresh Paghadal
(74) *Attorney, Agent, or Firm* — Sughrue Mion, PLLC

(57) ABSTRACT

In a wire harness routing structure, a main link arm supports a door main body to be slidable with respect to a vehicle body while relatively rotating with respect to each of the vehicle body and the door main body. A sub-link arm supports the door main body to be slidable with respect to the vehicle body together with the main link arm while relatively rotating with respect to each of the vehicle body and the door main body. A first wiring line is provided to be routed along the main link arm, and connects a vehicle body-side connector on the vehicle body side and a door-side connector on the door main body side. A second wiring line is provided to be routed along the sub-link arm and connects the vehicle body-side connector on the vehicle body side and a second door-side connection target on the door main body side.

9 Claims, 2 Drawing Sheets

WIRE HARNESS ROUTING STRUCTURE, LINK TYPE SLIDE DOOR, AND WIRE HARNESS

CROSS-REFERENCE TO RELATED APPLICATION (S)

This application is a continuation application of International Application No. PCT/JP2023/005915 filed on Feb. 20, 2023 which claims the benefit of priority from Japanese Patent Application No. 2022-028836 filed on Feb. 28, 2022 and designating the U.S., the entire contents of which are incorporated herein by reference.

BACKGROUND OF THE INVENTION

1. Field of the Invention

The present invention relates to a wire harness routing structure, a link type slide door, and a wire harness.

2. Description of the Related Art

Conventionally, for example, Japanese Patent Application Laid-open No. 2019-134626 describes a routing structure for a slide door. The routing structure for a slide door includes a slide door having a slide portion guided by a guide portion provided on a vehicle body side, a flexible conductor electrically connecting the slide door and the vehicle body side and traversing a trajectory space through which the slide portion passes, and a plate-shaped elastic body disposed along the conductor.

By the way, in a case where a link type slide door that does not include a slide portion but slides on the slide door by a link arm that fixes the slide door and a vehicle body is configured as the slide door, for example, in a case where a wire diameter of a wiring line connecting a device on the vehicle body side and a device on the slide door side is relatively large, it is difficult to bend the wiring line, and there is a possibility that wiring performance is deteriorated.

SUMMARY OF THE INVENTION

Therefore, the present invention has been made in view of the above, and an object of the present invention is to provide a wire harness routing structure, a link type slide door, and a wire harness capable of appropriately routing a wiring line.

In order to achieve the above mentioned object, a wire harness routing structure according to one aspect of the present invention includes a first link arm that has one end rotatably coupled to a vehicle body and the other end rotatably coupled to a door main body and supports the door main body to be slidable with respect to the vehicle body while relatively rotating with respect to each of the vehicle body and the door main body; a second link arm that is provided side by side with the first link arm along a vertical direction, has one end rotatably coupled to the vehicle body and the other end rotatably coupled to the door main body, and supports the door main body to be slidable with respect to the vehicle body together with the first link arm while relatively rotating with respect to each of the vehicle body and the door main body; a first wiring line that is provided to be routed along the first link arm and connects a first vehicle body-side connection target on the vehicle body side and a first door-side connection target on the door main body side; and a second wiring line that is provided to be routed along the second link arm and connects a second vehicle body-side connection target on the vehicle body side and a second door-side connection target on the door main body side.

A link type slide door according to another aspect of the present invention includes a door main body that is assembled to a vehicle body; a first link arm that has one end rotatably coupled to the vehicle body and the other end rotatably coupled to the door main body and supports the door main body to be slidable with respect to the vehicle body while relatively rotating with respect to each of the vehicle body and the door main body; a second link arm that is provided side by side with the first link arm along a vertical direction, has one end rotatably coupled to the vehicle body and the other end rotatably coupled to the door main body, and supports the door main body to be slidable with respect to the vehicle body together with the first link arm while relatively rotating with respect to each of the vehicle body and the door main body; a first wiring line that is provided to be routed along the first link arm and connects a first vehicle body-side connection target on the vehicle body side and a first door-side connection target on the door main body side; and a second wiring line that is provided to be routed along the second link arm and connects a second vehicle body-side connection target on the vehicle body side and a second door-side connection target on the door main body side.

A wire harness according to still another aspect of the present invention includes a first wiring line that has one end rotatably coupled to a vehicle body and the other end rotatably coupled to a door main body assembled to the vehicle body, is provided to be routed along a first link arm that slidably supports the door main body with respect to the vehicle body while relatively rotating with respect to each of the vehicle body and the door main body, connects a first vehicle body-side connection target on the vehicle body side and a first door-side connection target on the door main body side; and a second wiring line that is provided side by side with the first link arm along a vertical direction, has one end rotatably coupled to the vehicle body and the other end rotatably coupled to the door main body, is provided to be routed along a second link arm that slidably supports the door main body with respect to the vehicle body together with the first link arm while relatively rotating with respect to each of the vehicle body and the door main body, and connects a second vehicle body-side connection target on the vehicle body side and a second door-side connection target on the door main body side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
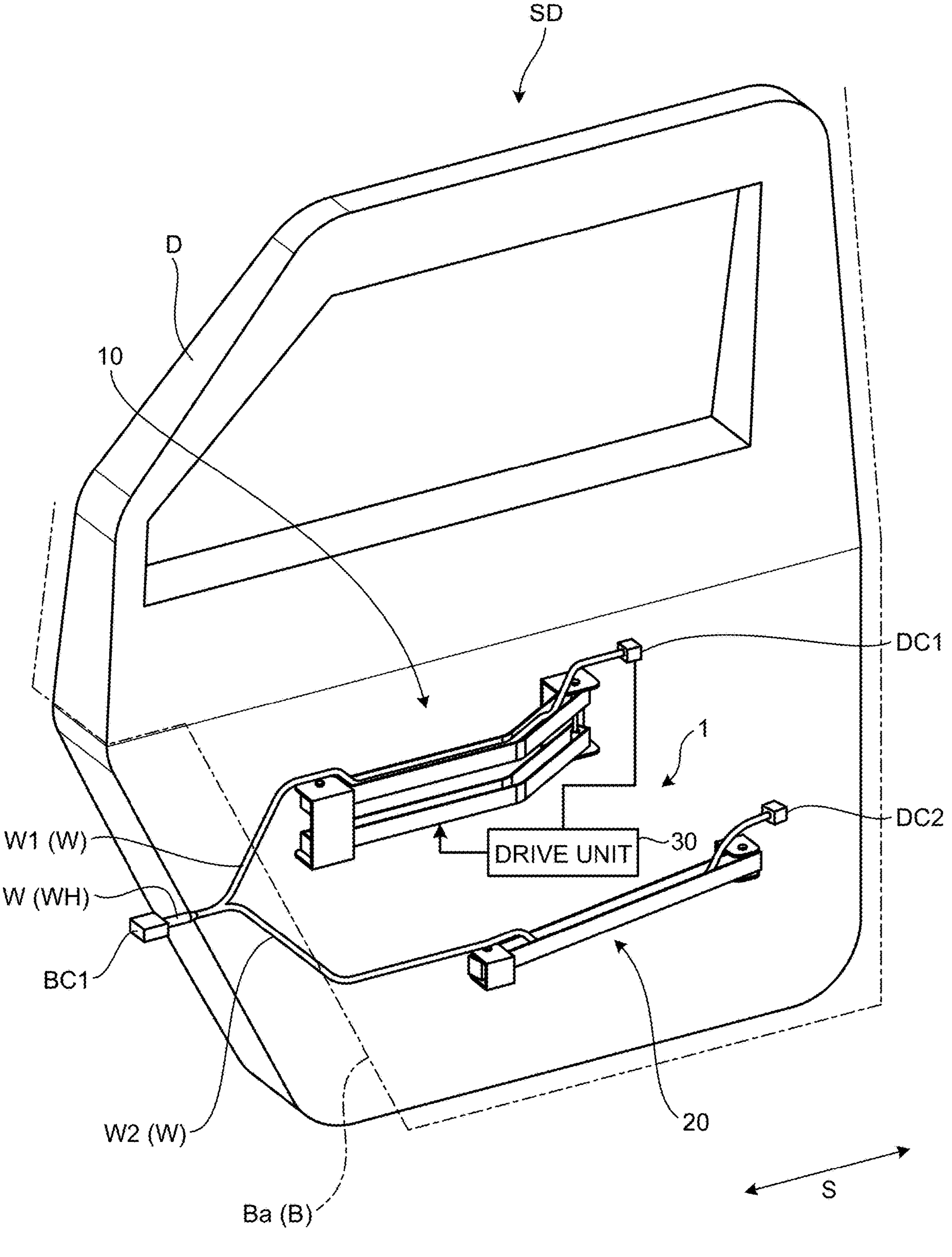
FIG. 1 is a perspective view illustrating a configuration example of a wire harness routing structure according to an embodiment.

A mode (embodiment) for carrying out the present invention will be described in detail with reference to the drawings. The present invention is not limited by the contents described in the following embodiment. In addition, constituent elements described below include those that can be easily assumed by those skilled in the art and those that are substantially the same. Furthermore, the configurations described below can be appropriately combined. In addition, various omissions, substitutions, or changes in the configuration can be made without departing from the gist of the present invention.

Embodiment

A wire harness routing structure 1, a link type slide door SD, and a wire harness WH according to embodiments will be described with reference to the drawings.

In the following description, among a first direction, a second direction, and a third direction intersecting each other, the first direction is referred to as an "extension direction X", the second direction is referred to as a "width direction Y", and the third direction is referred to as a "height direction Z (intersecting direction Z)". The extension direction X, the width direction Y, and the height direction Z intersect each other, and are typically orthogonal to each other. The extension direction X is, for example, a direction along a direction (longitudinal direction) in which a main link arm 11 to be described later extends. The width direction Y is, for example, a direction along a short direction of the main link arm 11. The height direction Z is a direction along a vehicle height direction (height direction of vehicle) of a vehicle, and is also a direction along the vertical direction. A sliding direction S of a door main body D is a direction along the extension direction X of the main link arm 11 in a state where the door main body D is closed, and corresponds to a direction along the entire length direction of the vehicle body B here. In other words, the sliding direction S of the door main body D is a direction intersecting a rotation axis (rotary shaft portions 12*a* and 13*a* to be described later) of the main link arm 11, and is typically a direction orthogonal to the rotation axis. Each direction used in the following description indicates a direction in a state in which each portion is assembled to each other unless otherwise specified.

The wire harness routing structure 1 is applied to a vehicle, supports the door main body D to be slidable with respect to the vehicle body B of the vehicle, and electrically connects a connection target such as a device or a connector provided on the vehicle body B side and a connection target such as a device or a connector provided on the door main body D side. In this example, a vehicle body-side connector BC1 as a first vehicle body-side connection target and a second vehicle body-side connection target is provided on the vehicle body B side, and a door-side connector DC1 as a first door-side connection target and a door-side connector DC2 as a second door-side connection target are provided on the door main body D side. The door-side connector DC1 is provided closer to a main link mechanism 10 to be described later than the door-side connector DC2, and the door-side connector DC2 is provided closer to a sub-link mechanism 20 to be described later than the door-side connector DC1. For example, the door-side connector DC1 is provided above the door-side connector DC2 in the height direction Z, and the door-side connector DC2 is provided below the door-side connector DC1 in the height direction z.

Figure 2:
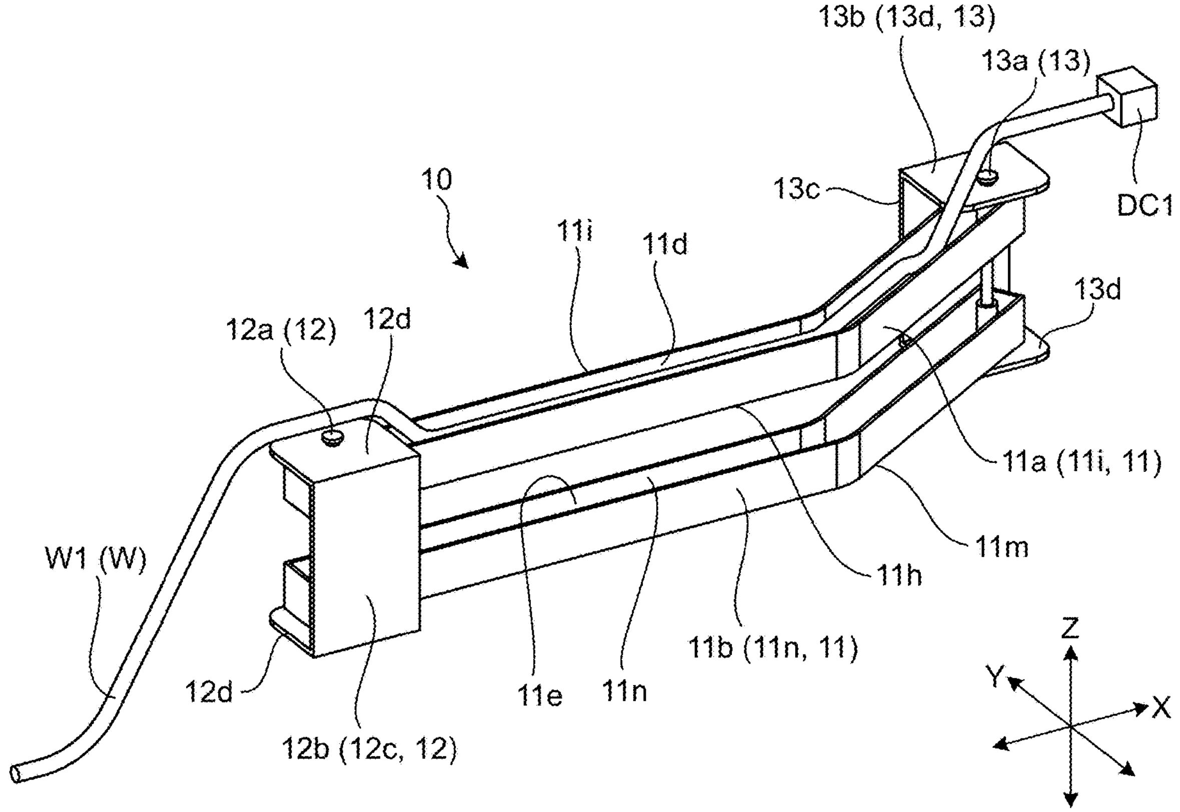
FIG. 2 is a perspective view illustrating a configuration example of a main link mechanism according to the embodiment.
Figure 3:
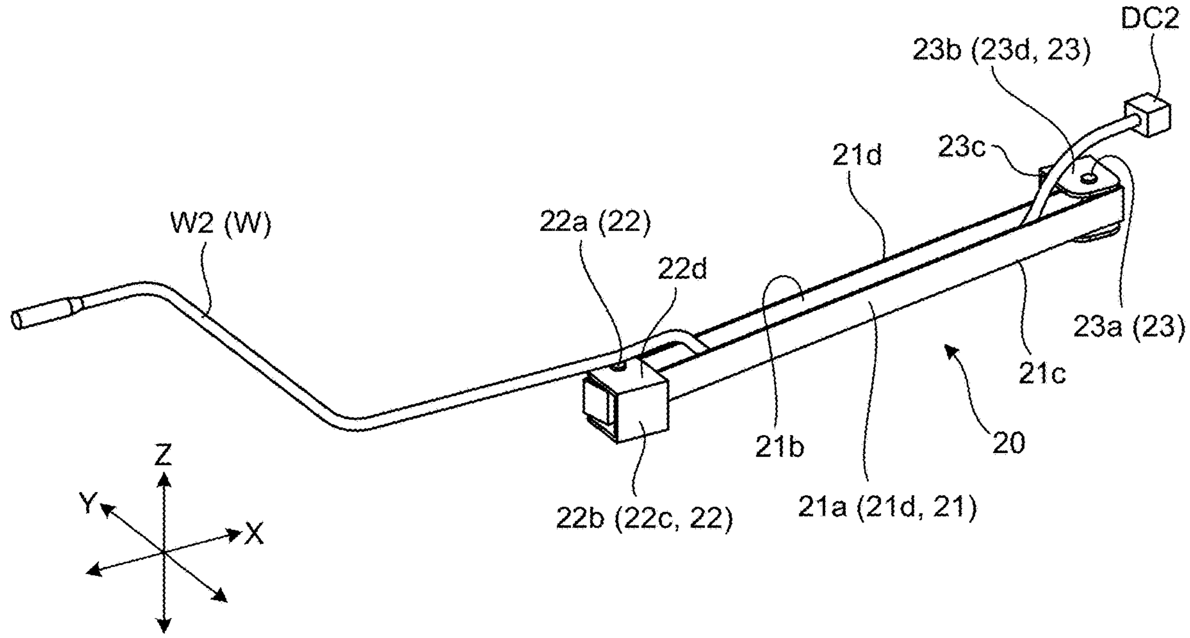
FIG. 3 is a perspective view illustrating a configuration example of a sub-link mechanism according to the embodiment.

As illustrated in FIGS. 1 to 3, the wire harness routing structure 1 includes the main link mechanism 10, the sub-link mechanism 20, a drive unit 30, a first wiring line W1, and a second wiring line W2. The first wiring line W1 and the second wiring line W2 constitute a wire harness WH. In other words, it can also be said that the wire harness WH includes the first wiring line W1 and the second wiring line W2. The door main body D, the main link mechanism 10, the sub-link mechanism 20, the drive unit 30, the first wiring line W1, and the second wiring line W2 constitute a link type slide door SD. In other words, it can also be said that the link type slide door SD includes the door main body D, the main link mechanism 10, the sub-link mechanism 20, the drive unit 30, the first wiring line W1, and the second wiring line W2.

Here, in the wire harness routing structure 1, the door main body D is supported by the main link mechanism 10 and the sub-link mechanism 20, and the main link arm 11 and a sub-link arm 21 described later are rotated, so that the door main body D is slid and moved in the sliding direction S with respect to the vehicle body B without using a general sliding guide rail. Hereinafter, the wire harness routing structure 1 will be described in detail.

As illustrated in FIG. 1, the main link mechanism 10 is a mechanism that slidably supports the door main body D with respect to the vehicle body B together with the sub-link mechanism 20. In FIG. 1, the door opening Ba of the vehicle body B is indicated by a one-dot chain line. The main link mechanism 10 includes a main link arm 11, a first coupling portion 12, and a second coupling portion 13.

The main link arm 11 is a member that slidably supports the door main body D with respect to the vehicle body B. The main link arm 11 includes a first arm 11*a* and a second arm 11*b*.

The first arm 11*a* is a metal member extending along the extension direction X and formed in an elongated shape. For example, the first arm 11*a* is formed in a shape having a bent portion bent from the vehicle body B side to the door main body D side. Note that the first arm 11*a* is not limited to such a bent shape as long as the door main body D can be slidably supported with respect to the vehicle body B. The first arm 11*a* includes a bottom surface portion 11*h* and a pair of side wall portions 11*i*. The bottom surface portion 11*h* is a portion located on one side (lower side) in the height direction Z, and is formed in an elongated and flat plate shape along the extension direction X. Each of the pair of side wall portions 11*i* is formed in an elongated and flat plate shape along the extension direction X, is erected along the height direction Z from both ends in the width direction Y of the bottom surface portion 11*h*, and is positioned at a constant interval along the width direction Y. In the first arm 11*a*, the other side (upper side) in the height direction Z of the bottom surface portion 11*h* is opened, and both end portions in the extension direction X are closed. The first arm 11*a* configured as described above accommodates the first wiring line W1 routed between the vehicle body B side and the door main body D side in a groove portion 11*d* to be described later formed by being surrounded by the bottom surface portion 11*h* and the pair of side wall portions 11*i*.

The second arm 11*b* is configured similarly to the first arm 11*a* described above. That is, the second arm 11*b* is a metal member extending along the extension direction X and formed in an elongated shape. For example, the second arm 11*b* is formed in a shape having a bent portion bent from the vehicle body B side to the door main body D side. Note that the second arm 11*b* is not limited to such a bent shape as long as the door main body D can be slidably supported with respect to the vehicle body B. The second arm 11*b* is arranged side by side with the first arm 11*a* along the height direction Z. The second arm 11*b* includes a bottom surface portion 11*m* and a pair of side wall portions 11*n*. The bottom surface portion 11*m* is a portion located on one side (lower side) in the height direction z, and is formed in a long and flat plate shape along the extension direction X. Each of the pair of side wall portions 11*n* is formed in an elongated and flat plate shape along the extension direction X, is erected along the height direction Z from both ends in the width direction Y of the bottom surface portion 11*m*, and is positioned at a constant interval along the width direction Y. In the second arm 11*b*, the other side (upper side) in the height direction Z of the bottom surface portion 11*m* is opened, and both end portions in the extension direction X are closed. The second arm 11*b* configured as described above can accommodate the first wiring line W1 routed between the vehicle body B side and the door main body D side in a groove portion 11*e* described later formed by being surrounded by the bottom surface portion 11*m* and the pair of side wall portions 11*n*.

Next, the first coupling portion 12 will be described. As illustrated in FIG. 2, the first coupling portion 12 rotatably couples one end of the main link arm 11 in the extension direction X to the vehicle body B, and includes a rotary shaft portion 12*a* and a bearing portion 12*b*.

The rotary shaft portion 12*a* rotatably supports one end of the main link arm 11 in the extension direction X. The rotary shaft portion 12*a* is formed in a rod shape, extends along the height direction Z, and is inserted through a hole portion (cylindrical hole portion) at one end in the extension direction X of the main link arm 11. Specifically, in the main link arm 11, the rotary shaft portion 12*a* is inserted through a hole portion at one end of the first arm 11*a* in the extension direction X and a hole portion at one end of the second arm 11*b* in the extension direction X. The rotary shaft portion 12*a* is provided with a stopper (not illustrated) for keeping the interval between the first arm 11*a* and the second arm 11*b* constant in the height direction Z. The stopper prevents the first arm 11*a* and the second arm 11*b* from being displaced in the height direction Z. The rotary shaft portion 12*a* extending along the height direction Z supports one end of the first arm 11*a* and one end of the second arm 11*b* to be rotatable about an axis of the rotary shaft portion 12*a*. Note that the configuration for preventing the first arm 11*a* and the second arm 11*b* from being displaced may be a configuration other than the stopper.

The bearing portion 12*b* couples the rotary shaft portion 12*a* to the vehicle body B. The bearing portion 12*b* includes a fixing plate 12*c* and a pair of support plates 12*d*.

The fixing plate 12*c* is a portion fixed to the vehicle body B. The fixing plate 12*c* is formed in a flat plate shape, extends along the height direction Z, and is fixed to the vehicle body B.

The pair of support plates 12*d* supports the rotary shaft portion 12*a*. Each of the pair of support plates 12*d* is formed in a flat plate shape, is erected along the width direction Y from both ends of the fixing plate 12*c* in the height direction Z, and is positioned at a constant interval along the height direction Z. The pair of support plates 12*d* is provided with a rotary shaft portion 12*a* between one support plate 12*d* and the other support plate 12*d*. Each of the pair of support plates 12*d* has a hole portion through which the rotary shaft portion 12*a* is inserted, one end of the rotary shaft portion 12*a* is inserted through the hole portion of one support plate 12*d*, and the other end of the rotary shaft portion 12*a* is inserted through the hole portion of the other support plate 12*d*. Retaining portions are provided at both end portions of the rotary shaft portion 12*a* inserted through the pair of support plates 12*d*. In the bearing portion 12*b* configured as described above, the fixing plate 12*c* is fixed to the vehicle body B in a state where both ends of the rotary shaft portion 12*a* inserted through the first arm 11*a* and the second arm 11*b* are supported by the pair of support plates 12*d*.

Next, the second coupling portion 13 will be described. As illustrated in FIG. 2, the second coupling portion 13 rotatably couples the other end of the main link arm 11 in the extension direction X to the door main body D, and is configured similarly to the first coupling portion 12. That is, the second coupling portion 13 includes a rotary shaft portion 13*a* and a bearing portion 13*b*.

The rotary shaft portion 13*a* rotatably supports the other end of the main link arm 11 in the extension direction X. The rotary shaft portion 13*a* is formed in a rod shape, extends along the height direction Z, and is inserted through a hole portion (cylindrical hole portion) at the other end in the extension direction X of the main link arm 11. Specifically, in the main link arm 11, the rotary shaft portion 13*a* is inserted through a hole portion at the other end of the first arm 11*a* in the extension direction X and a hole portion at the other end of the second arm 11*b* in the extension direction X. The rotary shaft portion 13*a* is provided with a stopper (not illustrated) for keeping the interval between the first arm 11*a* and the second arm 11*b* constant in the height direction Z. The stopper prevents the first arm 11*a* and the second arm 11*b* from being displaced in the height direction Z. The rotary shaft portion 13*a* extending along the height direction Z supports the other end of the first arm 11*a* and the other end of the second arm 11*b* to be rotatable about the axis of the rotary shaft portion 13*a*. Note that the configuration for preventing the first arm 11*a* and the second arm 11*b* from being displaced may be a configuration other than the stopper.

The bearing portion 13*b* couples the rotary shaft portion 13*a* to the door main body D. The bearing portion 13*b* includes a fixing plate 13*c* and a pair of support plates 13*d*.

The fixing plate 13*c* is a portion fixed to the door main body D. The fixing plate 13*c* is formed in a flat plate shape, extends along the height direction Z, and is fixed to the door main body D.

The pair of support plates 13*d* supports the rotary shaft portion 13*a*. Each of the pair of support plates 13*d* is formed in a flat plate shape, is erected along the width direction Y from both ends of the fixing plate 13*c* in the height direction Z, and is positioned at a constant interval along the height direction Z. The pair of support plates 13*d* is provided with the rotary shaft portion 13*a* between one support plate 13*d* and the other support plate 13*d*. Each of the pair of support plates 13*d* has a hole portion through which the rotary shaft portion 13*a* is inserted, one end of the rotary shaft portion 13*a* is inserted through the hole portion of one support plate 13*d*, and the other end of the rotary shaft portion 13*a* is inserted through the hole portion of the other support plate 13*d*. Retaining portions are provided at both end portions of the rotary shaft portion 13*a* inserted through the pair of support plates 13*d*. In the bearing portion 13*b* configured as described above, the fixing plate 13*c* is fixed to the door main body D in a state where both ends of the rotary shaft portion 13*a* inserted through the first arm 11*a* and the second arm 11*b* are supported by the pair of support plates 13*d*.

The main link arm 11 configured as described above supports the door main body D to be slidable along the sliding direction S with respect to the vehicle body B together with the sub-link mechanism 20 while relatively rotating with respect to each of the vehicle body B and the door main body D.

Next, the sub-link mechanism 20 will be described. The sub-link mechanism is provided side by side with the main link mechanism 10 along the height direction Z. In this example, the sub-link mechanism 20 is provided on the lower side of the main link mechanism 10 in the height direction Z, and supports the door main body D to be slidable with respect to the vehicle body B together with the main link mechanism 10. The sub-link mechanism 20 includes a sub-link arm 21, a first coupling portion 22, and a second coupling portion 23.

The sub-link arm 21 is provided side by side with the main link arm 11 along the height direction Z, and includes a first arm 21*a* as illustrated in FIG. 3.

The first arm 21*a* is a metal member extending along the extension direction X and formed in an elongated shape. The first arm 21*a* is formed linearly along the extension direction X, for example. Note that the first arm 21*a* is not limited to such a linear shape as long as the door main body D can be slidably supported with respect to the vehicle body B. The first arm 21*a* includes a bottom surface portion 21*c* and a pair of side wall portions 21*d*. The bottom surface portion 21*c* is a portion located on one side (lower side) in the height direction Z, and is formed in a long and flat plate shape along the extension direction X. Each of the pair of side wall portions 21*d* is formed in an elongated and flat plate shape along the extension direction X, is erected along the height direction Z from both ends in the width direction Y of the bottom surface portion 21*c*, and is positioned at a constant interval along the width direction Y. In the first arm 21*a*, the other side (upper side) in the height direction Z of the bottom surface portion 21*c* is opened, and both end portions in the extension direction X are closed. The first arm 21*a* configured as described above accommodates the second wiring line W2 routed between the vehicle body B side and the door main body D side in a groove portion 21*b* to be described later formed by being surrounded by the bottom surface portion 21*c* and the pair of side wall portions 21*d*.

Next, the first coupling portion 22 will be described. As illustrated in FIG. 3, the first coupling portion 22 rotatably couples one end of the sub-link arm 21 in the extension direction X to the vehicle body B, and includes a rotary shaft portion 22*a* and a bearing portion 22*b*.

The rotary shaft portion 22*a* rotatably supports one end of the sub-link arm 21 in the extension direction X. The rotary shaft portion 22*a* is formed in a rod shape, extends along the height direction Z, and is inserted through a hole portion (cylindrical hole portion) at one end of the sub-link arm 21 in the extension direction X. Specifically, the rotary shaft portion 22*a* is inserted through a hole portion at one end of the first arm 21*a* in the extension direction X in the sub-link arm 21. The rotary shaft portion 22*a* extending along the height direction Z supports one end of the first arm 21*a* to be rotatable about an axis of the rotary shaft portion 22*a*.

The bearing portion 22*b* couples the rotary shaft portion 22*a* to the vehicle body B. The bearing portion 22*b* includes a fixing plate 22*c* and a pair of support plates 22*d*.

The fixing plate 22*c* is a portion fixed to the vehicle body B. The fixing plate 22*c* is formed in a flat plate shape, extends along the height direction Z, and is fixed to the vehicle body B.

The pair of support plates 22*d* supports the rotary shaft portion 22*a*. Each of the pair of support plates 22*d* is formed in a flat plate shape, is erected along the width direction Y from both ends of the fixing plate 22*c* in the height direction Z, and is positioned at a constant interval along the height direction Z. The pair of support plates 22*d* is provided with a rotary shaft portion 22*a* between one support plate 22*d* and the other support plate 22*d*. Each of the pair of support plates 22*d* has a hole portion through which the rotary shaft portion 22*a* is inserted, one end of the rotary shaft portion 22*a* is inserted through the hole portion of one support plate 22*d*, and the other end of the rotary shaft portion 22*a* is inserted through the hole portion of the other support plate 22*d*. Retaining portions are provided at both end portions of the rotary shaft portion 22*a* inserted through the pair of support plates 22*d*. In the bearing portion 22*b* configured as described above, the fixing plate 22*c* is fixed to the vehicle body B in a state where both ends of the rotary shaft portion 22*a* inserted through the first arm 21*a* are supported by the pair of support plates 22*d*.

Next, the second coupling portion 23 will be described. As illustrated in FIG. 3, the second coupling portion 23 rotatably couples the other end of the sub-link arm 21 in the extension direction X to the door main body D, and is configured similarly to the first coupling portion 22. That is, the second coupling portion 23 includes a rotary shaft portion 23*a* and a bearing portion 23*b*.

The rotary shaft portion 23*a* rotatably supports the other end of the sub-link arm 21 in the extension direction X. The rotary shaft portion 23*a* is formed in a rod shape, extends along the height direction Z, and is inserted through a hole portion (cylindrical hole portion) at the other end of the sub-link arm 21 in the extension direction X. Specifically, in the sub-link arm 21, the rotary shaft portion 23*a* is inserted through a hole portion at the other end of the first arm 21*a* in the extension direction X. The rotary shaft portion 23*a* extending along the height direction Z supports the other end of the first arm 21*a* to be rotatable about an axis of the rotary shaft portion 23*a*.

The bearing portion 23*b* couples the rotary shaft portion 23*a* to the door main body D. The bearing portion 23*b* includes a fixing plate 23*c* and a pair of support plates 23*d*.

The fixing plate 23*c* is a portion fixed to the door main body D. The fixing plate 23*c* is formed in a flat plate shape, extends along the height direction Z, and is fixed to the door main body D.

The pair of support plates 23*d* supports the rotary shaft portion 23*a*. Each of the pair of support plates 23*d* is formed in a flat plate shape, is erected along the width direction Y from both ends of the fixing plate 23*c* in the height direction Z, and is positioned at a constant interval along the height direction Z. The pair of support plates 23*d* is provided with the rotary shaft portion 23*a* between one support plate 23*d* and the other support plate 23*d*. Each of the pair of support plates 23*d* has a hole portion through which the rotary shaft portion 23*a* is inserted, one end of the rotary shaft portion 23*a* is inserted through the hole portion of one support plate 23*d*, and the other end of the rotary shaft portion 23*a* is inserted through the hole portion of the other support plate 23*d*. Retaining portions are provided at both end portions of the rotary shaft portion 23*a* inserted through the pair of support plates 23*d*. In the bearing portion 23*b* configured as described above, the fixing plate 23*c* is fixed to the door main body D in a state where both ends of the rotary shaft portion 23*a* inserted through the first arm 21*a* are supported by the pair of support plates 23*d*.

The sub-link arm 21 configured as described above supports the door main body D to be slidable with respect to the vehicle body B together with the main link arm 11 while relatively rotating with respect to each of the vehicle body B and the door main body D.

Next, the drive unit 30 will be described. The drive unit 30 rotates the main link arm 11, and includes a motor and the like. The drive unit 30 is provided, for example, in the door main body D, and is connected to the first wiring line W1 via the door-side connector DC1. The drive unit 30 is operated by the power supplied via the first wiring line W1 to rotate the main link arm 11. The drive unit 30 is coupled to a rotary shaft of the main link arm 11 via, for example, a drive shaft, a gear, or the like that transmits rotational force, and rotates the rotary shaft to rotate the main link arm 11.

The wire harness routing structure 1 includes the groove portions 11*d* and 11*e* provided in the main link arm 11 and the groove portion 21*b* provided in the sub-link arm 21 as a structure for routing the wiring line W to the link type slide door SD as described above.

The groove portion 11*d* is provided in the first arm 11*a* of the main link arm 11, and is a region formed by being surrounded by the bottom surface portion 11*h* and the pair of side wall portions 11*i* of the first arm 11*a*. The groove portion 11*d* is formed in a groove shape along the extension direction X in the first arm 11*a*, and a cross section of the groove portion 11*d* is formed in a rectangular shape. The groove portion 11*d* has an accommodation space portion capable of accommodating the wiring line W, and can accommodate the wiring line W routed along the first arm 11*a* between the vehicle body B side and the door main body D side in the accommodation space portion. In this example, an example is illustrated in which the wiring line W (first wiring line W1) is actually accommodated in the accommodation space portion.

The groove portion 11*e* is provided in the second arm 11*b* of the main link arm 11, and is a region formed by being surrounded by the bottom surface portion 11*m* and the pair of side wall portions 11*n* of the second arm 11*b*. The groove portion 11*e* is formed in a groove shape along the extension direction X in the second arm 11*b*, and a cross section of the groove portion 11*e* is formed in a rectangular shape. The groove portion 11*e* has an accommodation space portion capable of accommodating the wiring line W, and can accommodate the wiring line W routed along the second arm 11*b* between the vehicle body B side and the door main body D side in the accommodation space portion. In this example, an example in which the wiring line W is not accommodated in the accommodation space portion is illustrated.

The groove portion 21*b* is provided in the first arm 21*a* of the sub-link arm 21, and is a region formed by being surrounded by the bottom surface portion 21*c* and the pair of side wall portions 21*d* of the first arm 21*a*. The groove portion 21*b* is formed in a groove shape along the extension direction X in the first arm 21*a*, and a cross section of the groove portion 21*b* is formed in a rectangular shape. The groove portion 21*b* has an accommodation space portion capable of accommodating the wiring line W, can accommodate the wiring line W routed along the first arm 21*a* between the vehicle body B side and the door main body D side in the accommodation space portion, and accommodates the wiring line W (second wiring line W2) in the accommodation space portion.

Next, the first wiring line W1 routed in the groove portion 11*d* of the main link arm 11 will be described. The first wiring line W1 includes a power line for supplying power, a communication line for performing communication, and the like. The first wiring line W1 is one wiring line branched on the vehicle body B side from one bundle of wiring lines W connected to the common vehicle body-side connector BC1. The first wiring line W1 is arranged and provided along the main link arm 11, and is routed in a state of being accommodated in the groove portion 11*d* of the main link arm 11 in this example. The first wiring line W1 accommodated in the groove portion 11*d* of the main link arm 11 connects the vehicle body-side connector BC1 provided on the vehicle body B side and the door-side connector DC1 provided on the door main body D side. In the first wiring line W1, a line length connecting the vehicle body-side connector BC1 and the door-side connector DC1 along the main link arm 11 is shorter than a length of a line connecting the vehicle body-side connector BC1 and the door-side connector DC1 via the sub-link arm 21. In this manner, the first wiring line W1 is routed along the shortest connection path when the vehicle body-side connector BC1 and the door-side connector DC1 are connected.

Next, the second wiring line W2 routed in the groove portion 21*b* of the sub-link arm 21 will be described. The second wiring line W2 includes a power line for supplying power, a communication line for performing communication, and the like. The second wiring line W2 is the other wiring line branched on the vehicle body B side from one bundle of the wiring lines W connected to the common vehicle body-side connector BC1. The second wiring line W2 is provided to be routed along the sub-link arm 21, and is routed in a state of being accommodated in the groove portion 21*b* of the sub-link arm 21 in this example. The second wiring line W2 accommodated in the groove portion 21*b* of the sub-link arm 21 connects the vehicle body-side connector BC1 provided on the vehicle body B side and the door-side connector DC2 provided on the door main body D side. In the second wiring line W2, a line length connecting the vehicle body-side connector BC1 and the door-side connector DC2 along the sub-link arm 21 is shorter than a length of a line connecting the vehicle body-side connector BC1 and the door-side connector DC2 via the main link arm 11. As described above, the second wiring line W2 is routed along the shortest connection path when the vehicle body-side connector BC1 and the door-side connector DC2 are connected.

In the wire harness routing structure 1 configured as described above, when the main link arm 11 is rotated by the drive unit 30, the main link arm 11 and the sub-link arm 21 are relatively rotated with respect to each of the vehicle body B and the door main body D, and the door main body D is slidingly moved along the sliding direction S from a fully closed position to a fully open position or from the fully open position to the fully closed position with respect to the vehicle body B. That is, the main link arm 11 is relatively rotated with respect to each of the vehicle body B and the door main body D with the rotary shaft portion 12*a* of the first coupling portion 12 and the rotary shaft portion 13*a* of the second coupling portion 13 as rotary shafts by being rotated by the drive unit 30. At this time, when the main link arm 11 is rotated by the drive unit 30, the sub-link arm 21 relatively rotates with respect to each of the vehicle body B and the door main body D using the rotary shaft portion 22*a* of the first coupling portion 22 and the rotary shaft portion 23*a* of the second coupling portion 23 as rotary shafts. The first wiring line W1 routed along the main link arm 11 and accommodated in the groove portion 11*d* electrically connects the vehicle body-side connector BC1 and the door-side connector DC1 even while the main link arm 11 rotates. In addition, the second wiring line W2 routed along the sub-link arm 21 and accommodated in the groove portion 21*b* electrically connects the vehicle body-side connector BC1 and the door-side connector DC2 while the sub-link arm 21 rotates.

As described above, the wire harness routing structure 1 according to the embodiment includes the main link arm 11, the sub-link arm 21, the first wiring line W1, and the second wiring line W2. The main link arm 11 has one end rotatably coupled to the vehicle body B and the other end rotatably coupled to the door main body D, and slidably supports the door main body D with respect to the vehicle body B while relatively rotating with respect to each of the vehicle body B and the door main body D. The sub-link arm 21 is provided side by side with the main link arm 11 along the height direction Z, has one end rotatably coupled to the vehicle body B and the other end rotatably coupled to the door main body D, and slidably supports the door main body D with respect to the vehicle body B together with the main link arm 11 while relatively rotating with respect to each of the vehicle body B and the door main body D. The first wiring line W1 is provided to be routed along the main link arm 11, and connects the vehicle body-side connector BC1 on the vehicle body B side and the door-side connector DC1 on the door main body D side. The second wiring line W2 is provided to be routed along the sub-link arm 21, and connects the vehicle body-side connector BC1 on the vehicle body B side and the door-side connector DC2 on the door main body D side.

With this configuration, in the wire harness routing structure 1, the wiring line W routed between the vehicle body B and the door main body D is routed while being divided into the first wiring line W1 and the second wiring line W2, so that the wire diameter of each wiring line can be relatively reduced, whereby the flexibility can be secured. Since the wire harness routing structure 1 can ensure the flexibility of the first and second wiring lines W1 and W2, it is possible to suppress a decrease in durability of the first and second wiring lines W1 and W2. In addition, since the wire diameter of the first and second wiring lines W1 and W2 can be reduced in the wire harness routing structure 1, the routing space in the vicinity of the main link arm 11 and the routing space in the vicinity of the sub-link arm 21 can be relatively reduced, the design components of the arms 11 and 12 can be reduced, and the appearance can be improved. As described above, the wire harness routing structure 1 can appropriately route the wiring line W.

In the wire harness routing structure 1, the first vehicle body-side connection target and the second vehicle body-side connection target are the common vehicle body-side connector BC1, and the first wiring line W1 is one wiring line branched on the vehicle body B side from one bundle of wiring lines W connected to the common vehicle body-side connector BC1. The second wiring line W2 is the other wiring line branched from one bundle of the wiring lines W on the vehicle body B side. Unlike the related art, with this configuration, the wire harness routing structure 1 can reduce the wire diameters of the first and second wiring lines W1 and W2 routed on the door main body D side as compared with a case where one bundle of the wiring lines W connected to the vehicle body-side connector BC1 is routed on the door main body D side in a state of one bundle of the wiring lines W as it is, so that the wiring lines W can be appropriately routed.

In the wire harness routing structure 1, a line length of the first wiring line W1 connecting the vehicle body-side connector BC1 and the door-side connector DC1 along the main link arm 11 is shorter than a length of a path connecting the vehicle body-side connector BC1 and the door-side connector DC1 via the sub-link arm 21. In the second wiring line W2, a line length connecting the vehicle body-side connector BC1 and the door-side connector DC2 along the sub-link arm 21 is shorter than a length of a path connecting the vehicle body-side connector BC1 and the door-side connector DC2 via the main link arm 11. With this configuration, in the wire harness routing structure 1, the vehicle body-side connector BC1 and the door-side connector DC1 can be connected by the first wiring line W1 at the shortest distance, and the vehicle body-side connector BC1 and the door-side connector DC2 can be connected by the second wiring line W2 at the shortest distance.

The wire harness routing structure 1 includes a drive unit 30 that is provided in the door main body D and rotates the main link arm 11. The first wiring line W1 includes a power line for supplying power to the drive unit 30. With this configuration, the wire harness routing structure 1 can rotate the main link arm 11 by operating the drive unit 30 with the power supplied via the first wiring line W1.

The link type slide door SD includes the door main body D assembled to the vehicle body B, the main link arm 11, the sub-link arm 21, the first wiring line W1, and the second wiring line W2. The first wiring line W1 is provided to be routed along the main link arm 11, and connects the vehicle body-side connector BC1 on the vehicle body B side and the door-side connector DC1 on the door main body D side. The second wiring line W2 is provided to be routed along the sub-link arm 21, and connects the vehicle body-side connector BC1 on the vehicle body B side and the door-side connector DC2 on the door main body D side. With this configuration, in the link type slide door SD, the wiring line W routed between the vehicle body B and the door main body D is divided into the first wiring line W1 and the second wiring line W2 and routed, so that the wire diameters of the respective wiring lines W1 and W2 can be relatively reduced, whereby the flexibility can be secured. As a result, the wiring line W can be appropriately routed.

The wire harness WH includes the first wiring line W1 provided to be routed along the main link arm 11 and connecting the vehicle body-side connector BC1 on the vehicle body B side and the door-side connector DC1 on the door main body D side, and the second wiring line W2 provided to be routed along the sub-link arm 21 and connecting the vehicle body-side connector BC1 on the vehicle body B side and the door-side connector DC2 on the door main body D side. With this configuration, in the wire harness WH, the wiring line W routed between the vehicle body B and the door main body D is routed separately into the first wiring line W1 and the second wiring line W2, so that the wire diameters of the respective wiring lines W1 and W2 can be relatively reduced, whereby the flexibility can be secured, and as a result, the wiring line W can be appropriately routed.

Modification

The example in which the first vehicle body-side connection target and the second vehicle body-side connection target are the common vehicle body-side connector BC1 has been described, but the present invention is not limited thereto. For example, the first vehicle body-side connection target and the second vehicle body-side connection target may be different vehicle body-side connectors.

The first door-side connection target and the second door-side connection target are different door-side connectors DC1 and DC2, respectively. However, the present invention is not limited to this. For example, the first door-side connection target and the second door-side connection target may be common door-side connectors.

The first and second wiring lines W1 and W2 have been described as an example in which one bundle of wiring lines W is the wiring line branched on the vehicle body B side, but the present invention is not limited thereto. For example, the first and second wiring lines W1 and W2 may not be a wiring line in which one bundle of wiring lines W is branched on the vehicle body B side, but may be a wiring line in which two bundles of wiring lines W are separately routed in parallel (parallel) from the vehicle body B side. Further, the first and second wiring lines W1 and W2 may merge (join) on the door main body D side to be connected to a common door-side connector.

Although the example in which the first and second wiring lines W1 and W2 are routed at the shortest distance has been described, the present invention is not limited thereto, and the first and second wiring lines W1 and W2 may not be routed at the shortest distance.

In the wire harness routing structure 1, an example in which the main link arm 11 is rotated by the drive unit 30 so that the main link arm 11 and the sub-link arm 21 rotate relative to each of the vehicle body B and the door main body D has been described, but the present invention is not limited thereto. For example, the main link arm 11 and the sub-link arm 21 may rotate relative to each of the vehicle body B and the door main body D by a sliding operation of the door main body D by an occupant of the vehicle without including the drive unit 30.

Although the example in which the drive unit 30 is provided in the door main body D has been described, the invention is not limited thereto, and for example, the drive unit may be provided in the main link arm 11. The drive unit 30 provided in the main link arm 11 is connected to the first wiring line W1 and operated by power supplied via the first wiring line W1 to rotate the main link arm 11. The drive unit 30 is coupled to a rotary shaft of the main link arm 11 via, for example, a drive shaft, a gear, or the like that transmits rotational force, and rotates the rotary shaft to rotate the main link arm 11.

Although the example in which the groove portions 11*d*, 11*e*, and 21*b* are formed in a rectangular cross section has been described, the present invention is not limited thereto, and for example, the cross section may be formed in a U-shape, a C-shape, an H-shape, or the like in which the bottom surface is curved.

In the groove portion 11*d*, an example in which the bottom surface portion 11*h* is located on one side (lower side) in the height direction Z, and the other side (upper side) in the height direction Z of the bottom surface portion 11*h* is opened has been described. However, the present invention is not limited to this. For example, the bottom surface portion 11*h* may be located on one side in the width direction Y, and the other side in the width direction Y of the bottom surface portion 11*h* may be opened. In this case, the pair of side wall portions 11*i* is provided on both sides in the height direction Z. As for the groove portions 11*e* and 21*b*, similarly, the bottom surface portions 11*m* and 21*c* may be positioned on one side in the width direction Y, and the other side in the width direction Y of the bottom surface portions 11*m* and 21*c* may be opened. In this case, the pair of side wall portions 11*n* and 21*d* is provided on both sides in the height direction Z.

Although the example in which the main link arm 11 rotates with the rotary shaft portions 12*a* and 13*a* at both ends as the rotary shafts in one arm member has been described, the present invention is not limited thereto. For example, the main link arm may be divided in the extension direction X, and the divided arms may be connected by links. In this case, a groove portion may be formed in each divided arm, each groove portion may be continuous across each divided arm, and the first wiring line W1 may be routed in the continuous groove portion across each divided arm.

The example in which the sub-link arm 21 rotates with the rotary shaft portions 22*a* and 23*a* at both ends as the rotary shaft in one arm member has been described, but the present invention is not limited thereto. For example, the sub-link arm may be divided in the extension direction X, and the divided arms may be connected by links. In this case, a groove portion may be formed in each divided arm, each groove portion may be continuous across each divided arm, and the second wiring line W2 may be routed in the continuous groove portion across each divided arm.

An example in which the main link mechanism 10 routes the wiring line W to the first arm 21*a* and does not route the wiring line W to the second arm 11*b* has been described, but the present invention is not limited thereto, and the wiring line W may also be routed to the second arm 11*b*.

Although the example in which the main link arm 11 includes the groove portions 11*d* and 11*e* has been described, the present invention is not limited thereto, and the main link arm may not include the groove portions 11*d* and 11*e*. In this case, the main link arm 11 is formed in, for example, a tubular shape, a rod shape (columnar shape), or the like, and when formed in the tubular shape, the first wiring line W1 is inserted and routed inside, and when formed in the rod shape (columnar shape), the first wiring line W1 is routed side by side with the arm.

Although the example in which the sub-link arm 21 includes the groove portion 21*b* has been described, the present invention is not limited thereto, and the sub-link arm may not include the groove portion 21*b*. In this case, the sub-link arm 21 is formed in, for example, a tubular shape, a rod shape (columnar shape), or the like, and when formed in the tubular shape, the second wiring line W2 is inserted and routed inside, and when formed in the rod shape (columnar shape), the second wiring line W2 is routed side by side with the arm.

In the wire harness routing structure, the link type slide door, and the wire harness according to the present embodiment, the wiring lines routed between the vehicle body and the door main body are routed while being divided into the first wiring line and the second wiring line. Therefore, the wire diameters of the respective wiring lines can be relatively reduced, flexibility can be secured, and thus, the wiring lines can be appropriately routed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness routing structure comprising:

a first link arm that has one end rotatably coupled by a first shaft to a vehicle body and the other end rotatably coupled by a second shaft to a door main body and supports the door main body to be slidable with respect to the vehicle body while relatively rotating with respect to each of the vehicle body and the door main body;

a second link arm that is provided side by side with the first link arm along a vertical direction, has one end rotatably coupled by a third shaft to the vehicle body and the other end rotatably coupled by a fourth shaft to the door main body, and supports the door main body to be slidable with respect to the vehicle body together with the first link arm while relatively rotating with respect to each of the vehicle body and the door main body;

a first wiring line that is provided to be routed and retained along the first link arm and connects a first vehicle body-side connection target on the vehicle body side and a first door-side connection target on the door main body side; and a second wiring line that is provided to be routed and retained along the second link arm and connects a second vehicle body-side connection target on the vehicle body side and a second door-side connection target on the door main body side.

2. The wire harness routing structure according to claim 1, wherein the first vehicle body-side connection target and the second vehicle body-side connection target are common connection targets, the first wiring line is one wiring line branched from one bundle of wiring lines connected to the common connection target on the vehicle body side, and the second wiring line is the other wiring line branched from the one bundle of wiring lines on the vehicle body side.

3. The wire harness routing structure according to claim 1, wherein in the first wiring line, a line length connecting the first vehicle body-side connection target and the first door-side connection target along the first link arm is shorter than a length of a path connecting the first vehicle body-side connection target and the first door-side connection target via the second link arm, and in the second wiring line, a line length connecting the second vehicle body-side connection target and the second door-side connection target along the second link arm is shorter than a length of a path connecting the second vehicle body-side connection target and the second door-side connection target via the first link arm.

4. The wire harness routing structure according to claim 2, wherein in the first wiring line, a line length connecting the first vehicle body-side connection target and the first door-side connection target along the first link arm is shorter than a length of a path connecting the first vehicle body-side connection target and the first door-side connection target via the second link arm, and in the second wiring line, a line length connecting the second vehicle body-side connection target and the second door-side connection target along the second link arm is shorter than a length of a path connecting the second vehicle body-side connection target and the second door-side connection target via the first link arm.

5. The wire harness routing structure according to claim 1, further comprising:

a drive unit that is provided in the door main body or the first link arm and rotates the first link arm, wherein the first wiring line includes a power line for supplying power to the drive unit.

6. The wire harness routing structure according to claim 2, further comprising:

a drive unit that is provided in the door main body or the first link arm and rotates the first link arm, wherein the first wiring line includes a power line for supplying power to the drive unit.

7. The wire harness routing structure according to claim 3, further comprising:

a drive unit that is provided in the door main body or the first link arm and rotates the first link arm, wherein the first wiring line includes a power line for supplying power to the drive unit.

8. A link type slide door comprising:

a door main body that is assembled to a vehicle body;

a first link arm that has one end rotatably coupled by a first shaft to the vehicle body and the other end rotatably coupled by a second shaft to the door main body and supports the door main body to be slidable with respect to the vehicle body while relatively rotating with respect to each of the vehicle body and the door main body;

a second link arm that is provided side by side with the first link arm along a vertical direction, has one end rotatably coupled by a third shaft to the vehicle body and the other end rotatably coupled by a fourth shaft to the door main body, and supports the door main body to be slidable with respect to the vehicle body together with the first link arm while relatively rotating with respect to each of the vehicle body and the door main body;

a first wiring line that is provided to be routed and retained along the first link arm and connects a first vehicle body-side connection target on the vehicle body side and a first door-side connection target on the door main body side; and a second wiring line that is provided to be routed and retained along the second link arm and connects a second vehicle body-side connection target on the vehicle body side and a second door-side connection target on the door main body side.

9. A wire harness comprising:

a first wiring line that has one end rotatably coupled to a vehicle body and the other end rotatably coupled to a door main body assembled to the vehicle body, is provided to be routed and retained along a first link arm that slidably supports the door main body with respect to the vehicle body while relatively rotating with respect to each of the vehicle body and the door main body by respective shafts, connects a first vehicle body-side connection target on the vehicle body side and a first door-side connection target on the door main body side; and a second wiring line that is provided side by side with the first link arm along a vertical direction, has one end rotatably coupled to the vehicle body and the other end rotatably coupled to the door main body, is provided to be routed and retained along a second link arm that slidably supports the door main body with respect to the vehicle body together with the first link arm while relatively rotating with respect to each of the vehicle body and the door main body by respective shafts, and connects a second vehicle body-side connection target on the vehicle body side and a second door-side connection target on the door main body side.

* * * * *